June 8, 1954  C. W. OPPHILE  2,680,842
PULL CORD ACTUATED ELECTRIC SWITCH
Filed Aug. 19, 1952
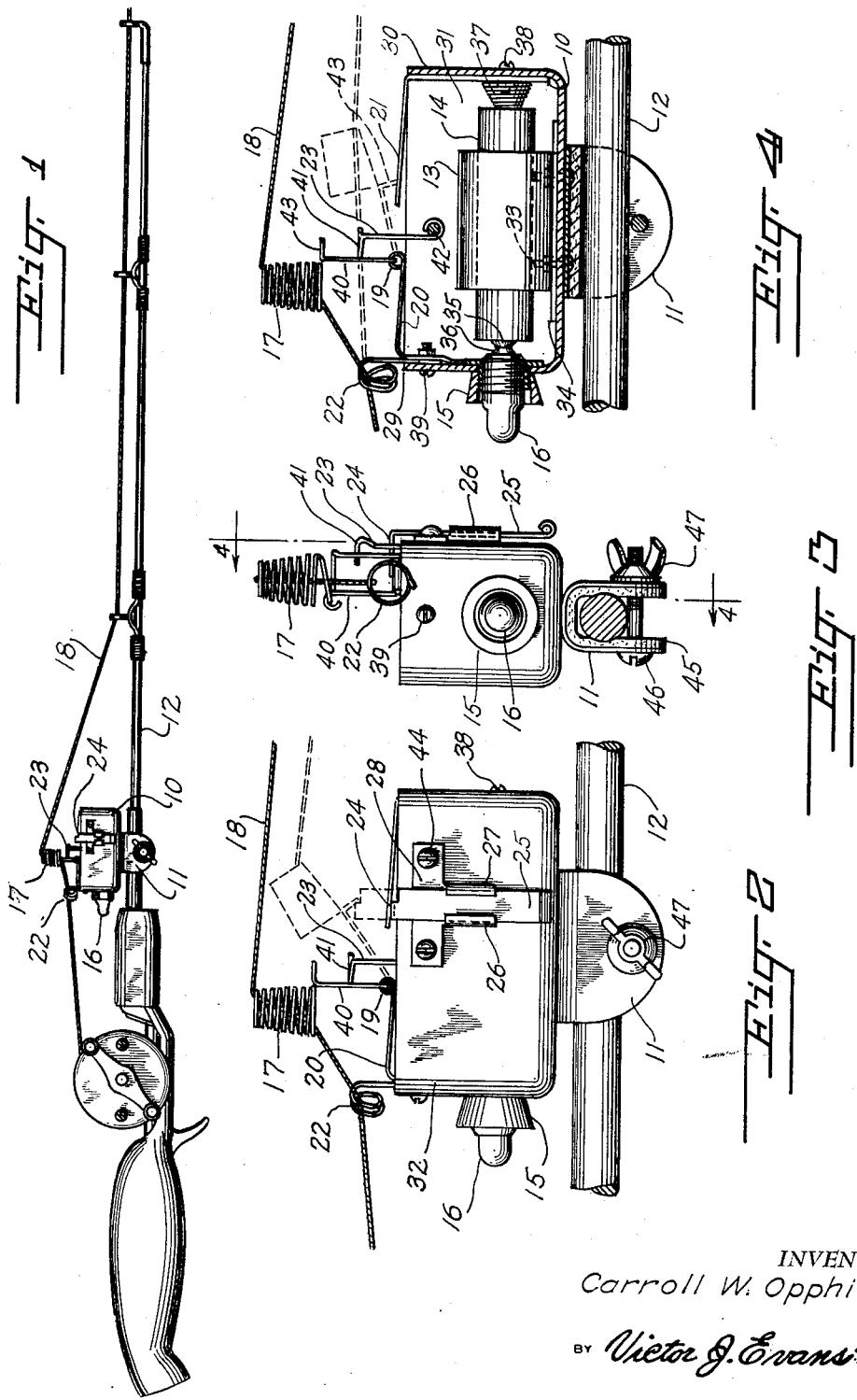
INVENTOR.
Carroll W. Opphile
BY Victor J. Evans & Co.
ATTORNEYS Patented June 8, 1954

2,680,842

UNITED STATES PATENT OFFICE 2,680,842

PULL CORD ACTUATED ELECTRIC SWITCH

Carroll W. Opphile, Knoxville, Tenn.

Application August 19, 1952, Serial No. 305,197

3 Claims. (Cl. 340—213)

This invention relates to electric switches of the type adapted to be actuated by a pull cord, and in particular a switch element positioned on a flash light casing whereby with the casing positioned on a fishing rod and with a fishing line trained through parts of the switch, tension on the fishing line, such as that resulting from a strike or bite of a fish, closes the switch and lights the light on the casing.

The purpose of this invention is to facilitate night fishing by providing a light in combination with a fishing line whereby the pull of a fish on a line causes the light to light.

Various types of pull cord electric switches have been provided, however, with the conventional type of switch for this use the pull cord is anchored to a part of the switch and such a device could not be used on a fishing line where the line must be free to be drawn through the switch actuating elements. With this thought in mind this invention contemplates an electric switch in combination with a flash light whereby with a fishing line extended through elements of the switch tension on the fishing line actuates the element that holds the switch and lights a light incorporated in the switch.

The object of this invention is, therefore, to provide means for forming an electric switch whereby a pull on a fishing line trained through the device closes the switch and lights a light used in combination therewith.

Another object of the invention is to provide means for mounting a light on a fishing rod whereby a pull on a fishing line trained along the rod causes the light to light.

A further object of the invention is to provide a fishing line actuated switch for lighting a light clamped on a fishing rod in which the device is of a simple and economical construction.

With these and other objects and advantages in view this invention embodies a casing for holding a battery and a light bulb, a contact positioned to close a circuit through the light bulb, and a clamp for mounting the casing on a fishing rod.

Other features and advantages of the invention will appear from the following description taken in connection with the drawing, wherein:

Figure 1 is a side elevational view illustrating a fishing rod and showing the fishing line actuated light mounted thereon.

Figure 2 is a view similar to that shown in Figure 1, showing the switch and light casing with the ends of the rod broken away and with the parts shown on an enlarged scale.

Figure 3 is an end elevational view looking toward the end of the casing in which the light is positioned showing a fishing rod on which the device is mounted, the rod being shown in section.

Figure 4 is a longitudinal section through the device taken on line 4—4 of Figure 3.

Referring now to the drawing wherein like reference characters denote corresponding parts the improved pull cord actuated switch of this invention includes a casing having a U clamp 11 for attaching the casing to a fishing rod 12, spring clips 13 mounted in the casing and positioned to hold a battery 14, a socket 15 or a light bulb 16, a coil 17 through which a fishing line 18 is trained and which is mounted in a loop 19 on a contact arm 20 and positioned to engage a spring contact 21 for completing a circuit through the battery and light bulb when tension is applied to the fishing line 18, a line guide 22, a switch lock 23 for holding the coil 17 in an upwardly extended position, and a tension arm 24 carried by a bar 25 and frictionally held between spring clips 26 and 27 on a base 28.

The casing 10 is provided with end walls 29 and 30 and side walls 31 and 32 and, as illustrated in Figure 4, the base thereof, to which the numeral 10 refers, is clamped to the back of the U-clamp 11 with screws 33 that extend through the back of the clip and through a plate 34 on the inner surface of the base. The spring clips or arms 13 extend upwardly from the plate 34 and the battery 14 is held by the spring arms or clips.

The battery 14 is held in position with a contact 35 at one end in engagement with a contact 36 of the light bulb 16 by a spring 37 that is held to the end wall 30 with a screw 38 and with the light bulb 16 threaded in the socket 15 the battery is suspended between the spring 37 and base of the light bulb. The spring contact 21 extends upwardly from the spring 37 providing one terminal of the switch and the contact 20 which is secured to the end wall 29 by a screw 39, extends around the base of the socket making a contact with the base of the light bulb 16.

The coil 17 is positioned at the upper end of an arm 40 that is pivotally mounted in the loop 19 and the coil is retained in the upwardly extended position by a loop 41 on the upper end of the switch lock or spring 23, the lower end of which is mounted on a rod 42.

With the parts in this position a pull on the cord or fishing line 18 draws the coil 17 from the position shown in full lines to the position shown in dotted lines whereby a loop 43 of the coil 17 contacts the spring contact 21, as shown in Figure 4, completing a circuit through the battery and light.

The base 28 is secured to the wall 32 of the casing by screws 44 and the bar 25 is frictionally held between the clips 26 and 27 whereby the arm 24 may extend over the upper end of the casing or may be extended upwardly, as indicated by the dotted lines, to restrain the coil 17 to prevent accidental contact of the loop 43 with the spring contact 21.

This tension device is used when fishing in swift currents and may be adjusted to compensate for the weight of bait when the fisherman is not fishing on the bottom of the lake or stream. The tension device may also be used as a shut off to prevent completing the circuit when the light is not in use.

Clamp 11 is lined with a pad of felt or the like, as indicated by the numeral 45, to prevent scratching a fishing rod, and the clamp is provided with a bolt 46 having a wing nut 47 thereon whereby the device may readily be installed upon a fishing rod and a line readily trained therethrough.

With the parts arranged in this manner a fishing line may readily be threaded through the coil 17 by working the line through the coil so that it is not necessary to break the line and with a line extended from a reel on the rod to a fishing lure on the extended end of the line the coil 17 will be held in an upperly extended position by the lock spring 23. When tension is applied to the line the coil 17 is pulled over to the position shown on dotted lines in Figure 4 whereby a part 43 contacts the spring contact 21. The line extends through the line guide 22 which extends upwardly from the end wall 29 of the casing and from the guide 22 the line extends to the reel.

It will be understood that although the pull cord actuated switch is illustrated in combination with a fishing rod it may also be used for other purposes.

It will be understood that modifications, within the scope of the appended claims, may be made in the design and arrangement of parts without departing from the spirit of the invention.

What is claimed is:

1. A circuit controlling apparatus including a mounting casing, an electric light and a battery to supply current to said light positioned in the casing and extended between ends thereof, said device comprising an L-shaped spring contact mounted on the casing and positioned with one end thereof in engagement with one end of the battery and with the opposite end extended over the casing, an L-shaped contact arm mounted on the casing and positioned with one section in contact with the electric light and the other extended over the casing, an arm having a coil on an extended end pivotally mounted on the section of the contact arm extended over the casing, and a switch lock pivotally mounted in the casing and positioned to retain the arm on which the coil is carried in an upwardly disposed position, said arm upon which the coil is carried being adapted, when released by the switch lock and upon the application of a force thereto resulting from a pull on a fishing line extended through the coil thereof to engage the end of the spring contact extended over the casing to complete a circuit through the battery and light.

2. A circuit controlling apparatus including a mounting casing, an electric light and a battery to supply current to said light positioned in the casing and extended between ends thereof, said device comprising an L-shaped spring contact mounted on the casing and positioned with one end thereof in engagement with one end of the battery and with the opposite end extended over the casing, an L-shaped contact arm mounted on the casing and positioned with one section in contact with the electric light and the other extended over the casing, an arm having a coil on an extended end pivotally mounted on the section of the contact arm extended over the casing, a friction coil extended from the end of the casing and positioned adjacent said contact arm, and a switch lock pivotally mounted in the casing and positioned to retain the arm on which the coil is carried in an upwardly disposed position, said arm upon which the coil is carried being adapted, when released by the switch lock and upon the application of a force thereto resulting from a pull on a fishing line extended through the coil thereof to engage the end of the spring contact extended over the casing to complete a circuit through the battery and light.

3. A circuit controlling apparatus including a mounting casing, an electric light and a battery to supply current to said light positioned in the casing and extended between ends thereof, said device comprising an L-shaped spring contact mounted on the casing and positioned with one end thereof in engagement with one end of the battery and with the opposite end extended over the casing, an L-shaped contact arm mounted on the casing and positioned with one section in contact with the electric light and the other extended over the casing, an arm having a coil on an extended end pivotally mounted on the section of the contact arm extended over the casing, a friction coil extended from the end of the casing and positioned adjacent said contact arm, a tension arm adjustably mounted on the casing and positioned to retard movement of the section of the contact arm on which the coil is carried, and a switch lock pivotally mounted in the casing and positioned to retain the arm on which the coil is carried in an upwardly disposed position, said arm upon which the coil is carried being adapted, when released by the switch lock and upon the application of a force thereto resulting from a pull on a fishing line extended through the coil thereof to engage the end of the spring contact extended over the casing to complete a circuit through the battery and light.

References Cited in the file of this patent

UNITED STATES PATENTS

| Number | Name | Date |
| --- | --- | --- |
| 2,196,784 | Simmons et al. | Apr. 9, 1940 |
| 2,354,279 | Ross | July 25, 1944 |
| 2,530,050 | Evans | Nov. 14, 1950 |
| 2,619,559 | Schenkel | Nov. 25, 1952 |